Jan. 30, 1968  G. K. MULHOLLAND  3,366,398
TOW BAR STRUCTURE FOR A VEHICLE HAVING AN
ARTICULATED SUSPENSION SYSTEM
Filed May 25, 1966
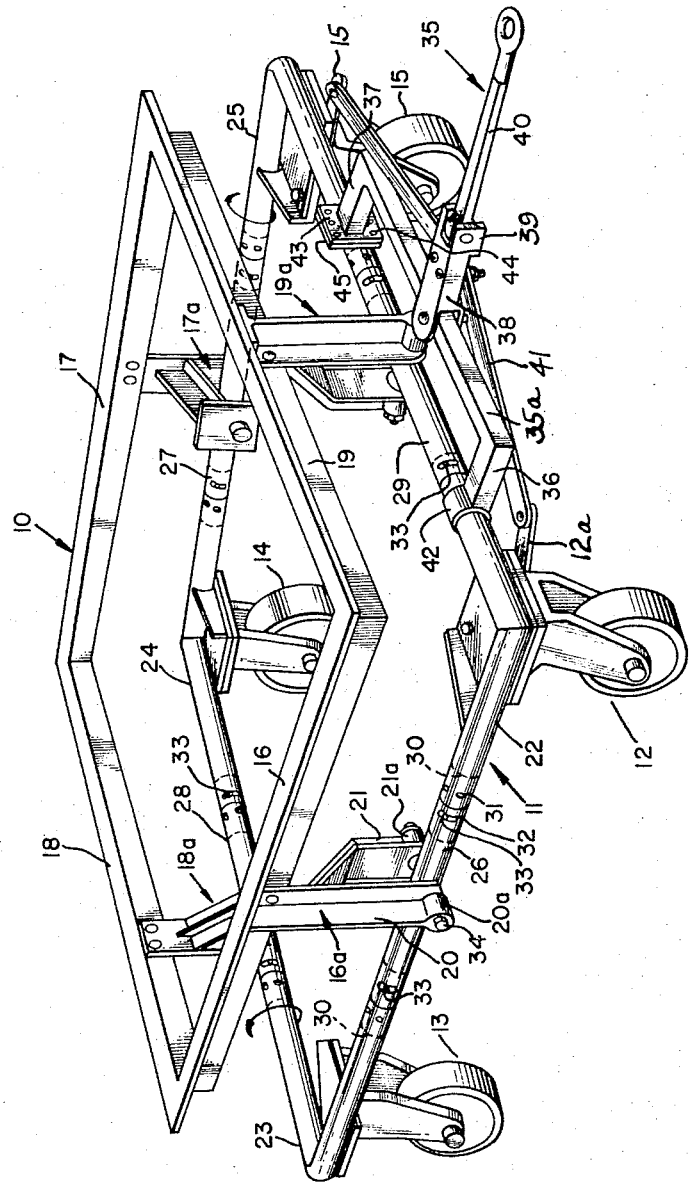
INVENTOR.
GEORGE K. MULHOLLAND
BY
*Learman, Learman & McCulloch*
ATTORNEYS

United States Patent Office

3,366,398
Patented Jan. 30, 1968

3,366,398
TOW BAR STRUCTURE FOR A VEHICLE HAVING AN ARTICULATED SUSPENSION SYSTEM
George K. Mulholland, Saginaw, Mich., assignor to Saginaw Products Corporation, Saginaw, Mich., a corporation of Michigan
Filed May 25, 1966, Ser. No. 552,761
5 Claims. (Cl. 280—103)

The present invention relates to articulated suspensions for four-wheeled vehicles and the like of the character illustrated in the Charles R. Bishop United States patent application Ser. No. 418,167, filed Dec. 14, 1964, and now Patent No. 3,266,815, and more particularly to tow bar structure for vehicles employing such a suspension. Generally speaking, such suspension systems include flexible or articulatable wheel mounting frames to which it is desired to attach a tow bar structure so that the vehicle may be readily towed behind a motive vehicle unit. Vehicles of the type disclosed in the aforementioned application comprise a rigid frame adapted to receive the load supported by a substantially rectangular, flexible frame including four angular corner pieces, a pair of longitudinally extending side members, and a pair of transversely extending end members, each end of each of the side and end members being rotatably coupled to the respectively associated corner piece. The vehicles also include means for attaching wheels or other surface engaging members to the corner pieces, and means pivotally connecting substantially the longitudinal centers of the side and end members to corresponding transversely separated points on the rigid frame in one embodiment of the invention in a manner so that the corner pieces may rotate with respect to the side and end pieces as uneven ground is encountered by the wheels. In another embodiment of the invention described the connection of the side and end members to the corner pieces permits the axial movement which in turn permits the corner pieces to rotate with respect to the side and end members as uneven ground is traversed by the wheels.

In the application mentioned, a relatively light duty vehicle was illustrated and the tow bar structure was connected to the front connecting tube of the flexible frame so that, regardless of the relative vertical positions of the wheels, the tow bar would not restrict the articulation of the frame. However, for relatively heavier vehicles and relatively heavy loads, such a construction is not particularly satisfactory.

One of the prime objects of the present invention is to provide an articulatable vehicle suspension with tow bar structure which is connected in a manner to secure to the wheel mounting corner pieces so that torques and forces imposed by the tow bar structure are transmitted to the corner pieces in a manner which does not affect the desired articulation of the suspension system.

Another object of the invention is to provide a vehicle assembly of the character described wherein the tow bar structure is unaffected in the functions which it is to perform by its connection to the corner pieces of the vehicle flexible frame.

Still a further object of the invention is to design a simple, reliable, rugged, and economical tow bar structure for trailers of the character described.

In the drawing, FIGURE 1 is an elevational perspective view.

Referring now more particularly to the accompanying drawing illustrating one embodiment of the invention only, the illustrated vehicle includes a rigid frame or body generally designated 10 and upon which the load to be carried by the vehicle is supported. The rigid frame 10 is supported by a flexible or articulatable frame generally designated 11 which is supported by wheeled casters 12–15 as shown. The rigid frame 10 includes side frame members 16 and 17 connected by end frame members 18 and 19, with each of the side frame members 16 and 17 and the end frame members 18 and 19 having dependent, bifurcated attachment beam structures generally designated 16a, 17a, 18a and 19a, respectively, extending downwardly at substantially the midportions of the respective rigid frame portions. Each of the bifurcated beam structures 16, 17a, 18a and 19a includes an outer leg portion 20 and an inner leg portion 21, both of which are provided with trunnions 20a and 21a, respectively.

The flexible frame 11 includes four corner pieces 22–25, tubular side members 26 and 27, and tubular end members 28 and 29. Each of the corner pieces 22–25 comprises a pair of perpendicularly disposed, tubular leg portions which are preferably welded together at their connecting ends, and it is to be understood that the side members 26 and 27 which connect the corner pieces 22 and 23, and 24 and 25, respectively, are rotatably coupled to the corner pieces which they connect. In a similar manner, the end tubes 28 and 29 are rotatably coupled to the corner pieces 23 and 24 and 22 and 25, respectively, which they connect.

As in the application mentioned, inner tubes 30 connected to the corner pieces as at 31 and received within the connecting tubes 26, 27, 28 and 29 may be employed to rotatably couple the corner pieces 22–25 and connecting tubes 26–29. Arcuate slots or openings 32 provided in the connecting tubes 26–29 are adapted to receive plugs 33 having substantially the same diameter as the width of the openings 32 but considerably smaller than the length of the openings 32. These plugs 33, which are fixed to the inner tubes 30, can then move upwardly and downwardly within the openings 32 as the corner pieces 22–25 rotate with respect to the connecting tubes 26–29. When this construction is employed, the legs 20 and 21 of the vertical beam structures 16a–19a will be connected in the manner disclosed in FIGURE 3 of the aforementioned Bishop application, the connection of these members being effected through pins 34 connecting with the connecting tubes 26–29 at points intermediate the respective sides of the flexible frame in a manner to provide the play described in the aforementioned application. Alternatively, the construction could be such that some lengthwise play is permitted between the connecting members 26–29 and the corner pieces 22–25 so that articulation is free to occur.

Tow bar structure generally designated 35 is provided so that the towed vehicle described may be drawn behind a motive vehicle and comprises arm portions 36 and 37 connected by a beam 35a situated forwardly of the bifurcated beam structure 19a. Provided on a steering tongue 38 which is pivoted to the beam 35a are ears 39 so that a forwardly projecting tow bar member 40 may be pivotally connected to the beam 35a. Tie rods 41 pivotally connect the tongue 38 with steering arms 12a and 15a on the front wheel assemblies 12 and 15. The arm 36 includes a bearing portion 42 which rotatably receives the one leg of corner piece 22, and the arm 37 has an integral plate 43 which may be bolted as at 44 to a plate 45 welded to the other front corner piece 25. In this manner the torques and forces imposed on the tow bar are transmitted to and taken by the corner pieces 22 and 25 without interfering with the articulation of the flexible frame 11.

In operation, with the tow bar structure 35 connected to a tractor vehicle, pivoting of the corner pieces 22–25 can occur freely because of the pivotal connection 42.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. A vehicle adapted to travel over a surface, comprising: a generally rectangular, flexible frame having four sides and including four corner assemblies; two generally parallel sides of said frame comprising the corner assemblies and a pair of spaced apart, generally parallel frame portions extending between said corner assemblies and having end portions, extending on lengthwise axes, connecting with said corner assemblies; the other two sides of said frame comprising said corner assemblies and means connecting them for relative rotation; surface engaging members carried by said corner assemblies and adapted to support said vehicle for movement along a surface; a body to be supported by said flexible frame; means pivotally connecting each of said generally parallel frame portions to said body intermediate the ends of said frame portions; means also otherwise supporting said body so that said frame portions pivot with respect thereto when one of said corner assemblies is raised with respect to another; certain of the end portions of the said frame portions and corner assemblies having axial bearing openings and certain of the said end portions and corner assemblies having axial bearing portions received within said openings to rotate about the lengthwise axes of said end portions so that said corner assemblies are axially rotatable relative to said end portions and are permitted to move up and down relative to said body and to each other; and tow bar means connected to said flexible frame including a first arm fixed to one of said corner pieces and a second arm connected to permit rotation of another corner piece relative to said second arm.

2. The combination defined in claim 1 in which said second arm of said tow bar means has a bearing portion rotatably receiving said another corner piece.

3. The combination defined in claim 2 in which said another corner piece comprises a pair of angular legs, one of which extends substantially perpendicularly to said tow bar and is received by said bearing portion.

4. The combination defined in claim 1 in which said surface engaging members are wheels.

5. A vehicle adapted to travel over a surface comprising: a generally rectangular, flexible frame having four sides and including four corner assemblies; two generally parallel sides of said frame comprising the corner assemblies and a pair of spaced apart, generally parallel frame portions extending between said corner assemblies and having end portions, connecting with said corner assemblies for relative rotation therewith; the other two sides of said frame comprising said corner assemblies and means connecting them for relative rotation; surface engaging members carried by said corner assemblies and adapted to support said vehicle for movement along a surface; a body to be supported by said flexible frame; means pivotally connecting each of said generally parallel frame portions to said body intermediate the ends of said generally parallel frame portions; and tow bar means connecting to said flexible frame including a first part secured to one of said corner pieces and a second part connected to permit rotation of another corner piece relative to said second part; and means connecting at least one of the said other two sides of said frame to said body in a manner which supports said body without interfering with said rotation and up and down movement.

References Cited

UNITED STATES PATENTS

| | | | |
|---|---|---|---|
| 3,001,798 | 9/1961 | Logan | 280—104 |
| 3,195,915 | 7/1965 | Moore | 280—103 |
| 3,266,815 | 8/1966 | Bishop | 280—104 |

LEO FRIAGLIA, *Primary Examiner.*